March 22, 1932. A. HULBERT 1,850,234

COMBINATION AUTOMOBILE TRUNK AND TABLE

Filed April 23, 1930

Inventor
Allie Hulbert.

Attorney

Patented Mar. 22, 1932

1,850,234

UNITED STATES PATENT OFFICE

ALLIE HULBERT, OF NAPOLEON, MICHIGAN

COMBINATION AUTOMOBILE TRUNK AND TABLE

Application filed April 23, 1930. Serial No. 446,608.

This invention appertains to equipment for automobile tourists and one of the primary objects of my invention is to provide an automobile trunk so constructed that the same can be readily converted into a table for eating purposes.

Another salient object of my invention is the provision of an automobile trunk so formed that its walls can be positioned to form a table top and support therefor, means being provided for holding the walls against movement when the same are disposed either to form the trunk or table.

A still further object of my invention is to provide an automobile trunk having a bottom wall with side and end walls hingedly connected thereto, the side walls form in connection with the bottom wall a table top when said side walls are swung parallel therewith, the end walls forming a support for the table top and having supporting legs or feet detachably connected therewith.

A still further object of my invention is the provision of a removable cover for the trunk acting as means for holding the walls in the upright position when the device is being used as a trunk.

A still further object of my invention is to provide a combined trunk and table for automobile tourists of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1:
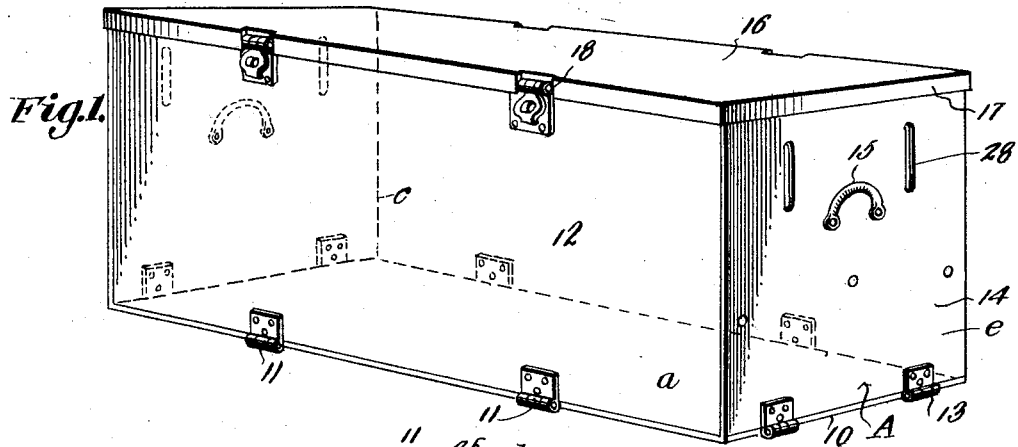
Figure 1 is a perspective view of my improved device showing the same in its set up position to form a trunk.
Figure 2:
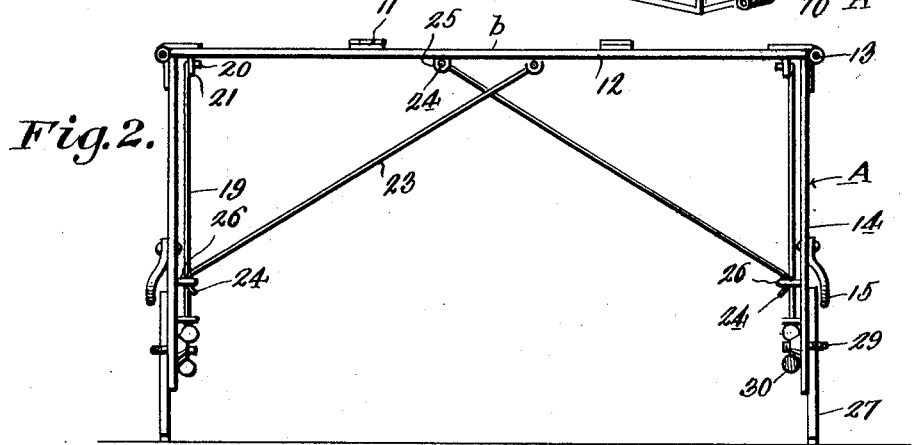
Figure 2 is a side elevation of my improved device showing the same in its set up position for forming a table.
Figure 3:
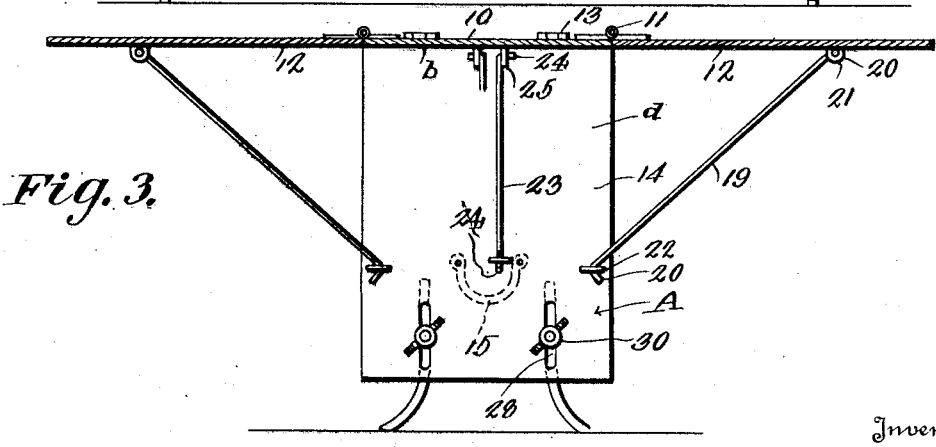
Figure 3 is an end elevation of my improved device showing the same set up to form a table.

Referring to the drawings in detail whereinin similar reference characters designate corresponding parts throughout the several views, the letter A generally indicates my improved combined automobile trunk and table which comprises a bottom wall 10 having connected to its longitudinal edges by suitable strap hinges 11 side walls 12. Likewise the end edges of the bottom wall 10 have connected thereto, by suitable strap hinges 13, end walls 14. These end walls 14 can be provided with any preferred type of carrying handles 15.

Any preferred type of fastening means can be provided for connecting the side and end walls 12 and 14 together, when these walls are arranged as shown in Figure 1 to form the trunk and these fastening means can be in the nature of hooks and eyes if desired.

A removable top wall 16 is employed to complete the trunk and this top wall is provided with depending marginal flanges 17 for engaging over the side and end walls as shown. This removable top wall 16 and the side walls 12 can carry suitable mating portions of catches 18 for holding the top wall thereon when the device is being used as a trunk.

When my improved device is to be used as a table, the top wall or cover 16 is completely removed from the device and the side walls 12 are swung outward so as to lie in coplanar relation to the bottom wall 10 on opposite sides thereof. These side walls 12 then form the leaves of the table.

In order to hold the leaves or side walls 12 in their extended position I employ supporting rods 19 the opposite ends of which are provided with angularly disposed hooks 20 which engage in eyes 21 and 22 carried respectively by the inner surface of the side wall 12 and the end walls 14. These rods 19 can be placed inside the device when the same is being used as a trunk. The end walls 14 are held in their right angular position relative to the bottom wall 10 by the rods 19 and the device is turned over so that the end walls 14 will depend from the top to form supporting means for the device. If desired, additional brace rods 23 can be provided for the end walls 14 and as shown the terminals of these brace rods are provided with angularly extending hooks 24 for engaging in eyes 25 and 26 carried respectively by the top wall 10 and the end walls 14.

In this way I am enabled to form a rigid and useful table and if it is desired to support the table top at a greater distance from the ground than that provided by the end walls 14, detachable legs or feet 27 can be connected with the said end walls. As shown, the end walls 14 are provided with spaced parallel slots 28 for the reception of screw eyes 29, the shanks of which can be placed through said slots for receiving the feet 27. The threaded portions of the shanks can then have placed thereon winged nuts 30 for drawing the eye portions of said screws into intimate contact with the legs or feet 27.

The entire device is of such a construction that a very few minutes is necessary to set the device up as a table or to take the same down and again form the trunk for travelling purposes.

Changes in details may be made without departing from the spirit or the scope of this invention, but

What I claim as new is:

A combined trunk and table comprising a main wall, side walls hingedly connected with the main wall for movement either into coplanar relation thereto on opposite sides thereof or at right angles to said main wall, hook receiving eyes carried by the inner faces of said side walls, end walls hingedly connected with the main wall and provided with hook receiving eyes on the inner face thereof, detachable brace rods having hooked ends for connection with the eyes on the side and end walls when the end walls are arranged in coplanar relation to the main wall, a removable cover for engagement with the end and side walls when the same are disposed at right angles to the main wall, and removable outwardly curved feet for the end walls for use when the device is set up as a table, and means for detachably connecting the feet to said end walls, said means embodying screw eyes for receiving the feet, the end walls being provided with slots for receiving the shanks of the screw eyes and clamping means for engagement with the threaded shank of the screw eyes for locking said feet in an adjusted position.

In testimony whereof I affix my signature.

ALLIE HULBERT.